(12) United States Patent
Chew et al.

(10) Patent No.: US 10,068,619 B1
(45) Date of Patent: Sep. 4, 2018

(54) HAND HELD STORAGE DEVICE

(71) Applicant: Western Digital Technologies, Inc., Irvine, CA (US)

(72) Inventors: David W. Chew, San Juan Capistrano, CA (US); Thomas J. Hitchner, San Martin, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 289 days.

(21) Appl. No.: 14/341,653

(22) Filed: Jul. 25, 2014

(51) Int. Cl.
*G11B 33/06* (2006.01)
*H04M 1/02* (2006.01)

(52) U.S. Cl.
CPC .......... *G11B 33/06* (2013.01); *H04M 1/0256* (2013.01)

(58) Field of Classification Search
None
See application file for complete search history.

(56) References Cited

U.S. PATENT DOCUMENTS

| | | | | |
|---|---|---|---|---|
| 5,132,871 A * | 7/1992 | Densham | .............. | G06F 1/1632 361/679.31 |
| 6,710,576 B1 * | 3/2004 | Kaufman | .............. | H02J 7/0044 320/107 |
| 6,891,721 B2 * | 5/2005 | Huang | ................. | G11B 25/043 361/679.33 |
| 7,114,085 B1 * | 9/2006 | Kim | ........................ | G06F 1/266 713/300 |
| 7,275,252 B2 * | 9/2007 | Volk | ..................... | G11B 7/1263 720/630 |
| 7,461,271 B2 * | 12/2008 | Penning | ................ | G06F 1/3203 360/73.02 |
| 7,701,705 B1 | 4/2010 | Szeremeta | | |
| 8,064,194 B2 | 11/2011 | Szeremeta | | |
| 8,113,873 B1 | 2/2012 | Sarraf | | |
| 8,133,426 B1 | 3/2012 | Yurchenco et al. | | |
| 8,358,395 B1 | 1/2013 | Szeremeta | | |
| 8,417,979 B2 | 4/2013 | Maroney | | |
| 8,462,460 B1 | 6/2013 | Szeremeta et al. | | |
| 8,498,088 B1 | 7/2013 | Klein | | |
| 8,547,658 B1 | 10/2013 | Szeremeta | | |
| 8,761,819 B2 * | 6/2014 | Rogitz | ............. | H04M 1/72552 455/418 |
| 2003/0204737 A1 * | 10/2003 | Lee | ......................... | G06F 21/80 713/193 |
| 2004/0190192 A1 * | 9/2004 | Huang | ................. | G11B 25/043 360/99.13 |
| 2005/0094312 A1 * | 5/2005 | Sato | ..................... | G11B 5/5521 360/99.13 |
| 2006/0209649 A1 * | 9/2006 | Vlutters | ................. | G11B 19/26 369/47.38 |

(Continued)

FOREIGN PATENT DOCUMENTS

| | | | | |
|---|---|---|---|---|
| CN | 103442103 A | * | 12/2013 | |
| EP | 2077480 A1 | * | 7/2009 | ........... G06F 1/1616 |

(Continued)

*Primary Examiner* — William J Klimowicz
(74) *Attorney, Agent, or Firm* — Chang & Hale LLP

(57) ABSTRACT

A hand held data storage apparatus includes a disk-based storage device, an interface configured for data transfer with the storage device, and an enclosure that encapsulates the storage device and the interface, wherein the enclosure is configured with a rectangular mobile phone form factor.

23 Claims, 10 Drawing Sheets

(56) References Cited

U.S. PATENT DOCUMENTS

| | | | | |
|---|---|---|---|---|
| 2008/0024893 A1* | 1/2008 | Vanjani | ............... | H01Q 1/243 |
| | | | | 360/1 |
| 2008/0144270 A1* | 6/2008 | Dal Porto | ............ | H05K 5/0278 |
| | | | | 361/679.31 |
| 2011/0164374 A1* | 7/2011 | Tai | ..................... | H01R 13/72 |
| | | | | 361/679.33 |
| 2011/0286173 A1* | 11/2011 | Moore | ................. | G06F 1/187 |
| | | | | 361/679.31 |
| 2013/0257712 A1* | 10/2013 | Imamura | ............. | H01Q 1/243 |
| | | | | 345/156 |
| 2015/0076187 A1* | 3/2015 | Cohen | ................ | A45C 15/00 |
| | | | | 224/191 |
| 2015/0189767 A1* | 7/2015 | Asrani | ................. | B32B 15/08 |
| | | | | 312/223.1 |
| 2017/0192476 A1* | 7/2017 | Shaw | .................... | G06F 1/266 |

FOREIGN PATENT DOCUMENTS

| | | | | | |
|---|---|---|---|---|---|
| GB | 2445002 A | * | 6/2008 | ............ | G06F 1/263 |
| JP | 2006228300 A | * | 8/2006 | | |
| JP | 2007242225 A | * | 9/2007 | | |
| JP | 2012044678 A | * | 3/2012 | | |
| KR | 20020027143 A | * | 4/2002 | | |
| WO | WO 2007038057 A1 | * | 4/2007 | ........... | G11B 7/1263 |

\* cited by examiner

HAND HELD STORAGE DEVICE

BACKGROUND

A variety of storage devices are widely available to the general consumer in this age of digital data. Of these, the hard disk drive (HDD) still provides the largest storage capacity most reliable form of long duration storage of data files. Digital media is becoming more commonplace for hand held mobile devices such as mobile phones, which quickly consumes data storage on such devices. Hence, there is a demand for portable high capacity storage capability that is compatible with current preference for a hand held device form factor.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1A:
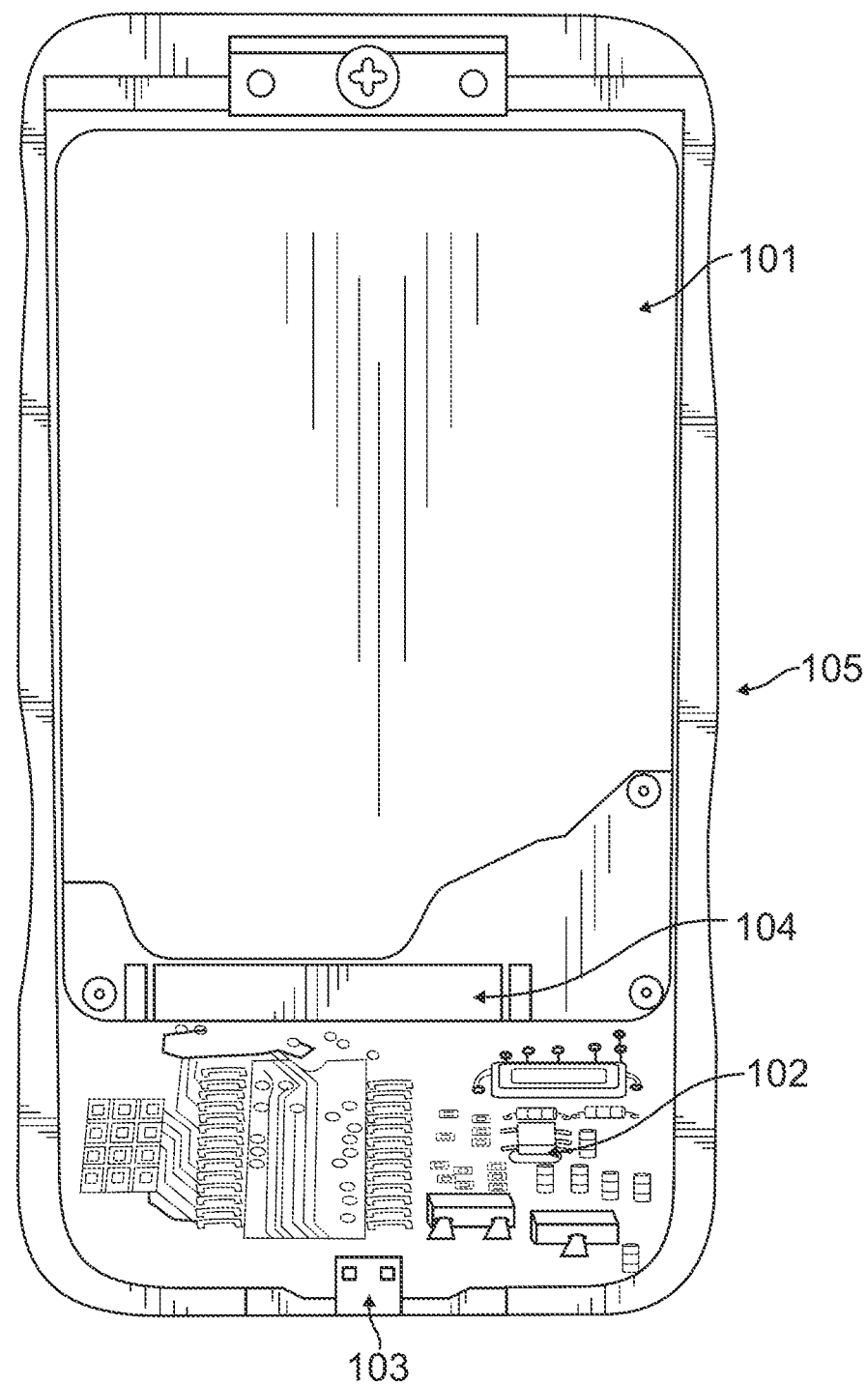
FIG. 1A shows an exemplary embodiment of a hand held storage device with a portion of the enclosure removed.

The detailed description set forth below in connection with the appended drawings is intended as a description of various exemplary embodiments and is not intended to represent the only embodiments that may be practiced. The detailed description includes specific details for the purpose of providing a thorough understanding of the embodiments. However, it will be apparent to those skilled in the art that the embodiments may be practiced without these specific details. In some instances, well-known structures and components are shown in block diagram form in order to avoid obscuring the concepts of the embodiments. Acronyms and other descriptive terminology may be used merely for convenience and clarity and are not intended to limit the scope of the embodiments.

The various exemplary embodiments illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Various embodiments will be described herein with reference to drawings that are schematic illustrations of idealized configurations. As such, variations from the shapes of the illustrations as a result of manufacturing techniques and/or tolerances, for example, are to be expected. Thus, the various embodiments presented throughout this disclosure should not be construed as limited to the particular shapes of elements illustrated and described herein but are to include deviations in shapes that result, for example, from manufacturing. By way of example, an element illustrated or described as having rounded or curved features at its edges may instead have straight edges. Thus, the elements illustrated in the drawings are schematic in nature and their shapes are not intended to illustrate the precise shape of an element and are not intended to limit the scope of the described embodiments.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments include the described components, structure, features, functionality, processes, advantages, benefits, or modes of operation.

As used herein, the term "about" followed by a numeric value means within engineering tolerance of the provided value.

In the following detailed description, various aspects of the present invention will be presented in the context of a hand held storage device that includes a hard disk drive.

An aspect of a portable data storage apparatus includes a disk-based storage device, an interface configured for data transfer with the storage device; and an enclosure that encapsulates the storage device and the interface, wherein the enclosure is configured with a rectangular mobile phone form factor.

FIG. 1A shows a rear view of an exemplary embodiment of a hand held storage device 100 with an enclosure body 105 that conforms to a rectangular mobile phone form factor. A back plate cover is omitted here in FIG. 1 in order to illustrate the interior components of device 100. The storage device 100 may include a disk-based storage drive 101 that fits within the enclosure body 105. For example, the storage drive 101 may be a 2.5-inch form factor hard drive. Alternatively, the disk-based storage drive 101 may be a 1.8-inch form factor hard drive. Alternatively, the disk-based storage drive 101 may be supplemented with solid state memory that fits within the enclosure body 105 to form a solid state hybrid drive (SSHD) for the storage device 100.

The storage device 100 may include an interface 102, such as a circuit board having a processor and a wireless transceiver, configured for wireless data transfer with the storage device 100. Examples of wireless transceivers that may be included are WiFi and Bluetooth transceivers. The hard disk drive 101 may be coupled to the interface 102 using a connector 104, such as a SATA connector or an equivalent. The storage device 100 may include a port 103, shown in FIG. 1A at the bottom of device 100, for receiving power from an external source and for wired data transfer with an external device. For example, port 103 may be a USB type port (e.g., USB 2.0 or 3.0). As another example, port 103 may be a Thunderbolt type port. Although one port 103 is shown in FIG. 1A, this embodiment is not limited to only one port, as there may alternatively be a plurality of ports to accommodate more than one type of connection.

Data transfer to the storage drive 101 and from the storage drive 101 may be controllable by the processor to switch between a wireless data transfer and a wired transfer. For example, connecting the device 100 to an external device via a wire connection at the port 103 may trigger the processor to switch the interface 102 from a wireless data transfer mode to a wired data transfer mode for faster data transfer. Disconnecting the wired connection at port 103 may trigger the processor to switch the interface to a wireless transfer mode using the wireless transceiver for the convenience of wireless data transfer.

Power to the storage drive 101 may be exclusively provided by a connection to an external power source via port 103 as device 100 may be configured without an internal battery in order to conserve space within the enclosure body 105, and to minimize the thickness dimension and weight of the device 100. For example, power may be delivered to the storage device 101 by connecting a USB cord from port 103 to an external battery, a 120 VAC/5 VDC converter, or a computer USB port. From a power pin in port 103, a bus on interface 102 may connect the 5 VDC to a power pin in the storage drive connector 104.

Figure 1B:
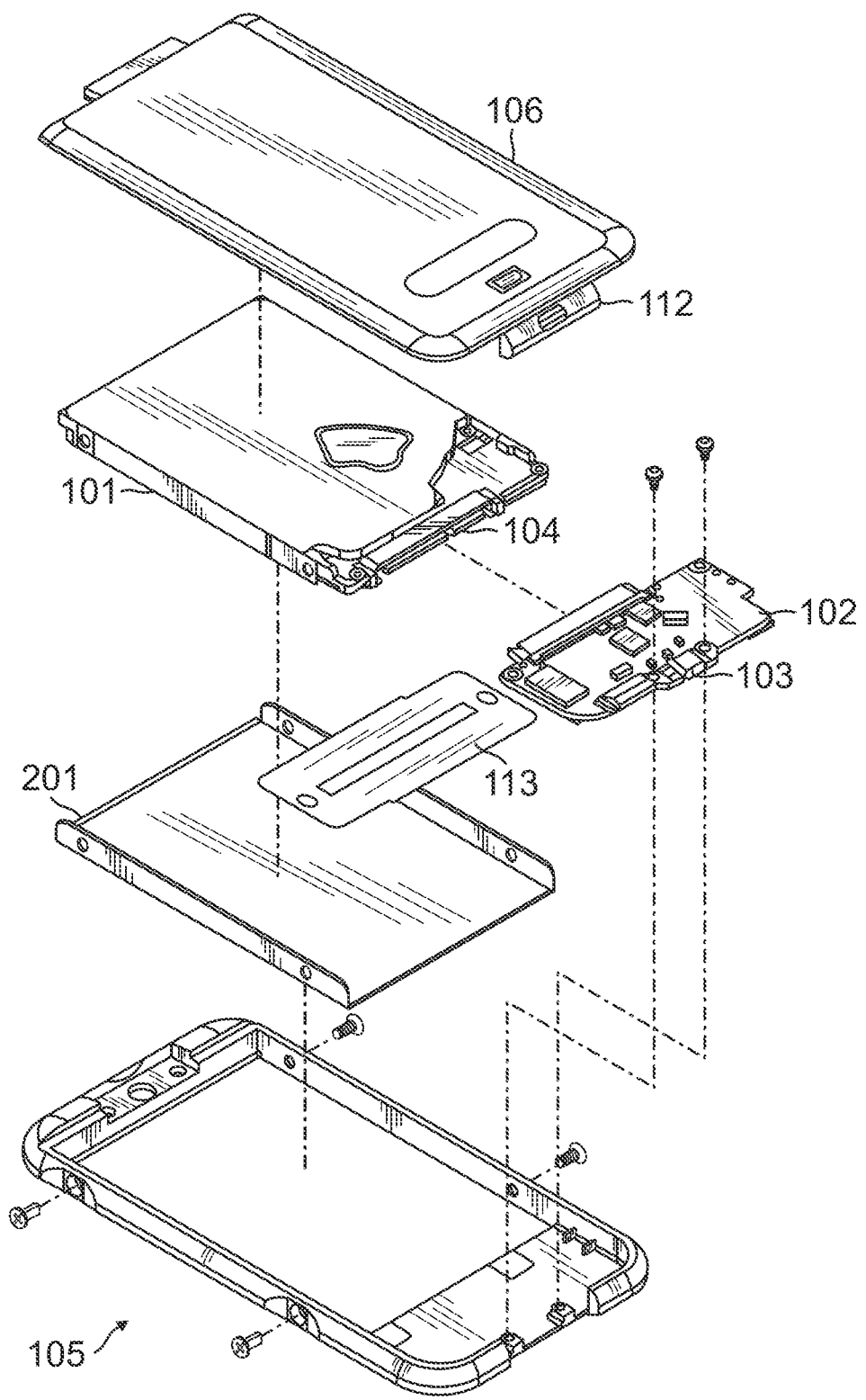
FIG. 1B shows an exploded view of the exemplary embodiment shown in FIG. 1A.

FIG. 1B shows an exploded view of the device 100, which includes an enclosure back plate 106, storage drive 101, interface 102, protection plate 113, housing 201, and enclosure body 105. The enclosure back plate 106 may include fastening means 112, such as a mechanical fastener that mates with the enclosure body 105. Other possible fastening means include, but are not limited to, screws, tabs and magnetic fasteners. The storage drive 101 may be connected to the interface 102 using the connector 104. Alternatively, the orientation of the storage drive 101 and interface 102 may be reversed within a modified version of the enclosure body 105, and back plate 106, which would allow external interface 103 arranged at the top end of the device 100. The enclosure body 105 and back plate cover 106 may then have an access area opposite to end as shown, to expose interface 103 at the top end of device 100. The housing 201 is arranged to protect the storage drive 101 and protection plate 113 is arranged to shield circuit elements of interface 102 within enclosure body 105.

Figure 1C:
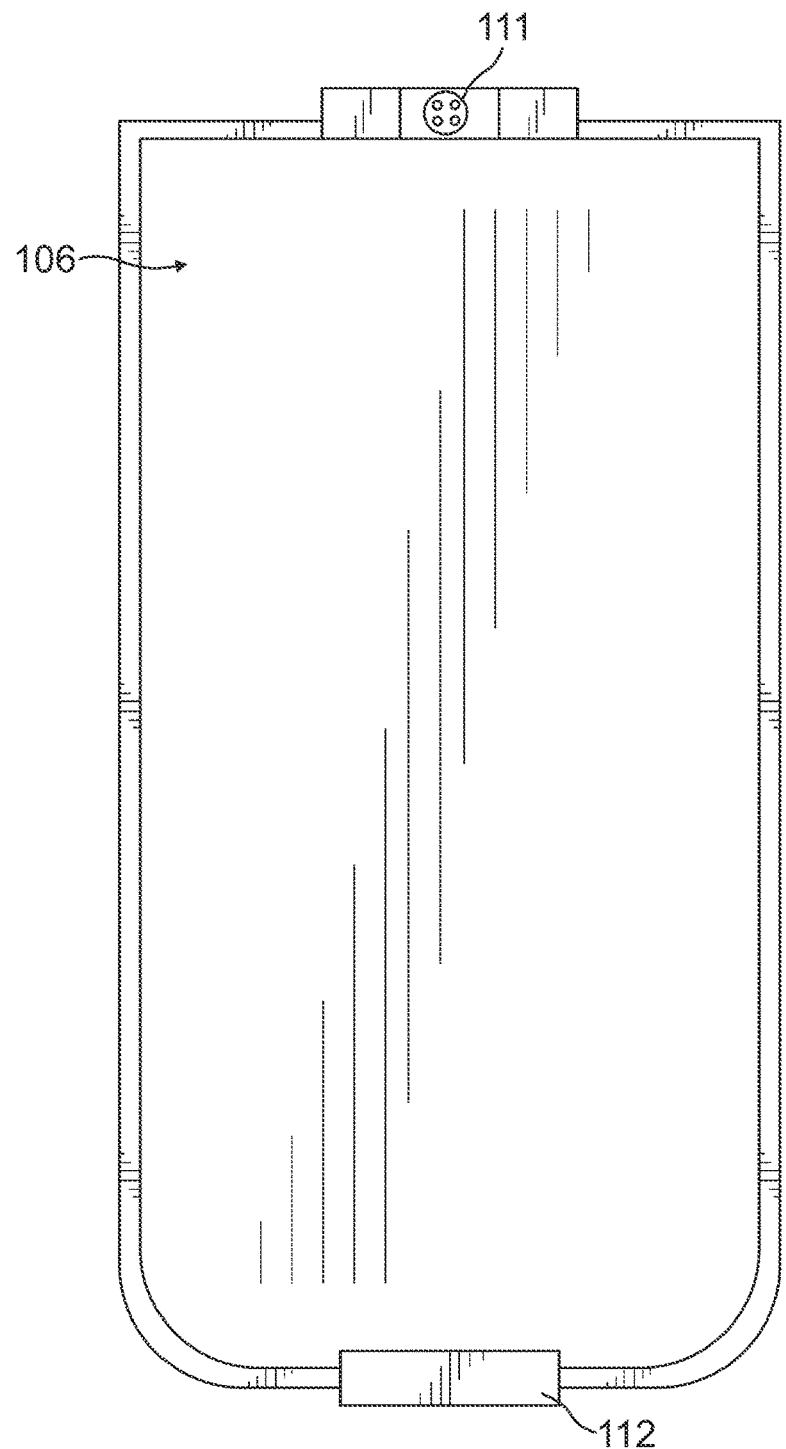
FIG. 1C shows an exemplary embodiment of a portion of the enclosure for the device shown in FIG. 1A.

FIG. 1C shows an exemplary embodiment of a back plate 106 that fits together with enclosure body 105 to encapsulate the storage drive 101 and interface 102. The back plate 106 may be made with the same material as the enclosure body 105, such as a durable plastic. Alternatively, the back plate 106 may be formed of a lightweight metal, such as aluminum for example. The back plate 106 may be coupled to the enclosure body 105 by a snap on mechanical connection 112, a magnetic connection 111, or alternatively by using one or more fasteners such as screws.

Figure 2A:
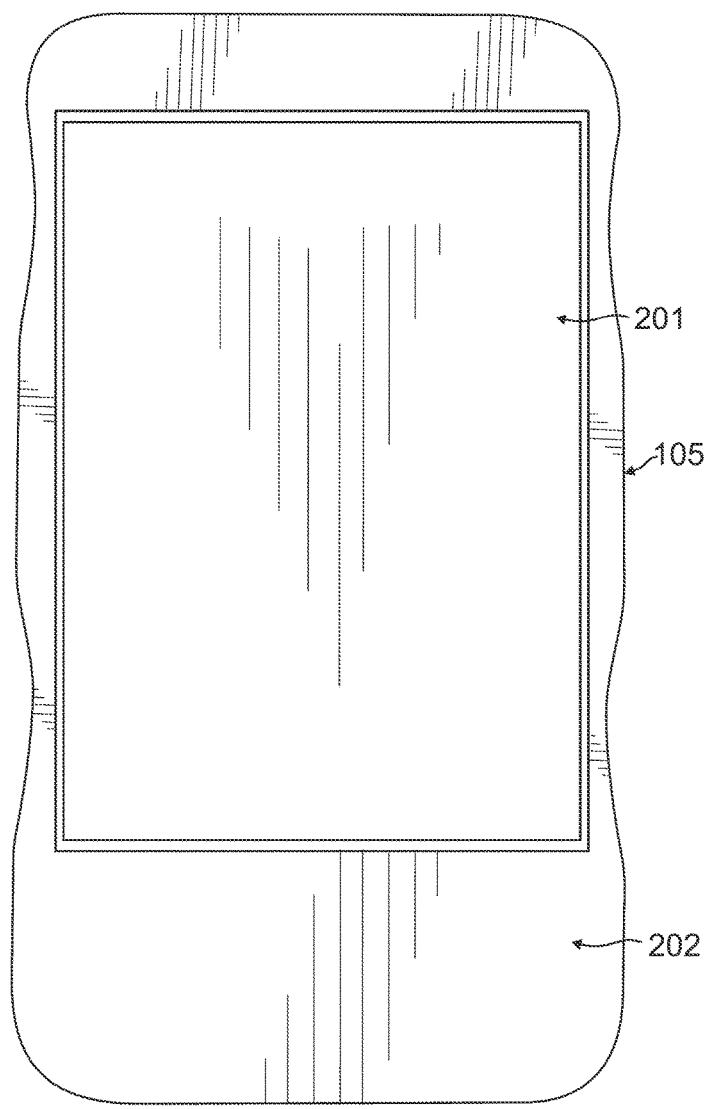
FIG. 2A shows an exemplary embodiment for the opposite side of a hand held storage device as shown in FIG. 1A.
Figure 2B:
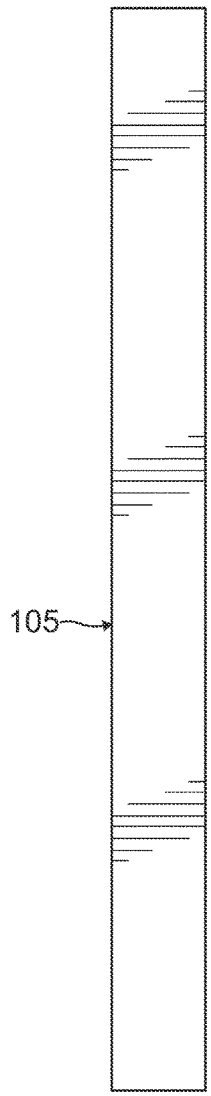
FIG. 2B shows an exemplary embodiment for the thickness profile of a hand held storage device as shown in FIG. 1A.

FIGS. 2A and 2B illustrate exemplary embodiments for the storage device 100 for the face side of device 100 and a thickness profile of device 100, respectively. The housing 201 or a portion of housing 201 may be metallic for hard protection of the storage drive 101. The housing 201 can provide added rigidity to the enclosure. In one embodiment, the housing 201 is thinner than the surrounding enclosure material to reduce the weight of the enclosure as a whole. Alternatively, the housing 201 of the storage drive 101 may be a hard plastic material. The enclosure 105 body may include a region 202 made of a non-metallic material, such as plastic, so that the wireless transceiver and corresponding antenna on interface 102 may be accessible to electromagnetic energy, such as wireless signals.

FIG. 2B illustrates a thickness profile for the enclosure body 105 coupled with the back plate 106. The thickness of enclosure body 105 and back plate 106 for the device 100 may be configured thin enough to resemble a mobile phone when held in hand, thus conforming to a form factor of a mobile phone. For example, the face of enclosure body 105 may have a rectangular aspect ratio range of about 1.8:1 to 2:1, or alternatively, about 1.8:1 to 1.9:1. As another example, the face of enclosure body 105 may have an area range of about 9,800 to 13,600 $mm^2$, or alternatively about 10,000 to 12,500 $mm^2$, or alternatively about 11,800 to 12,300 $mm^2$. As yet another example, the enclosure body 105 and back cover 106 of the device 100 may have an area to thickness ratio range of about 1200:1 to 2500:1, or alternatively about 1250:1 to 1450:1. In another example, the enclosure body 105 may have a length within a range of about 140 to 160 mm, or alternatively about 145 to 152 mm. The width of the enclosure body 105 may be within a range of about 70-85 mm or alternatively about 75 to 82 mm. The thickness of enclosure body 105 with the back plate cover 106 may be about 6-15 mm, or alternatively, about 7-11 mm.

Figure 3:
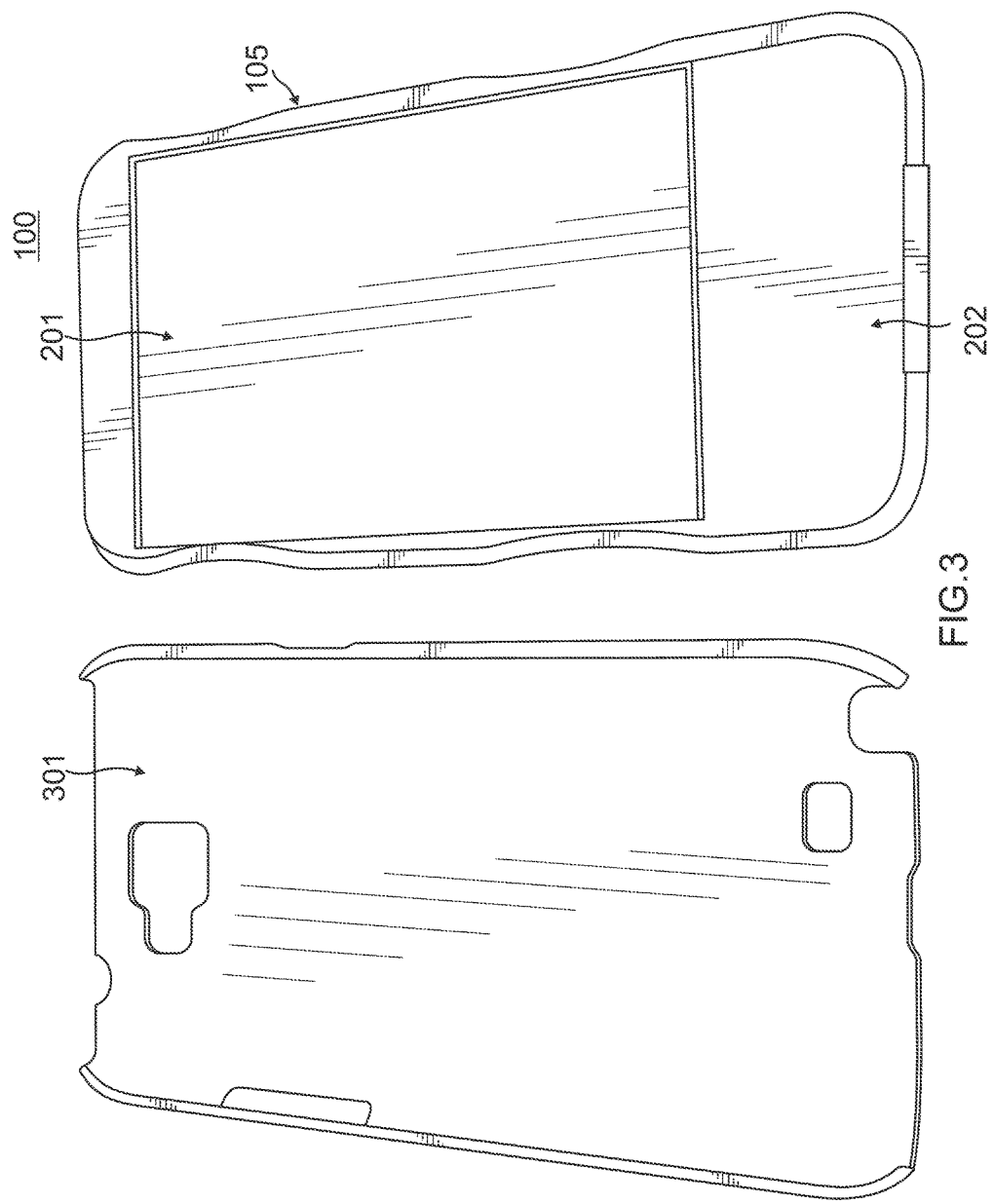
FIG. 3 shows an exemplary mobile phone protective shell removed from the hand held storage device.

FIG. 3 shows an example of a compatible mobile phone accessory that will fit the enclosure body 105 and back plate cover 106. In this example, a protective shell 301 may be customized to fit the form factor for a mobile phone which has dimensions corresponding to the enclosure body 105 and back plate cover 106. As such, any accessories compatible for this mobile phone form factor may be applied to the device 100.

Figure 4:
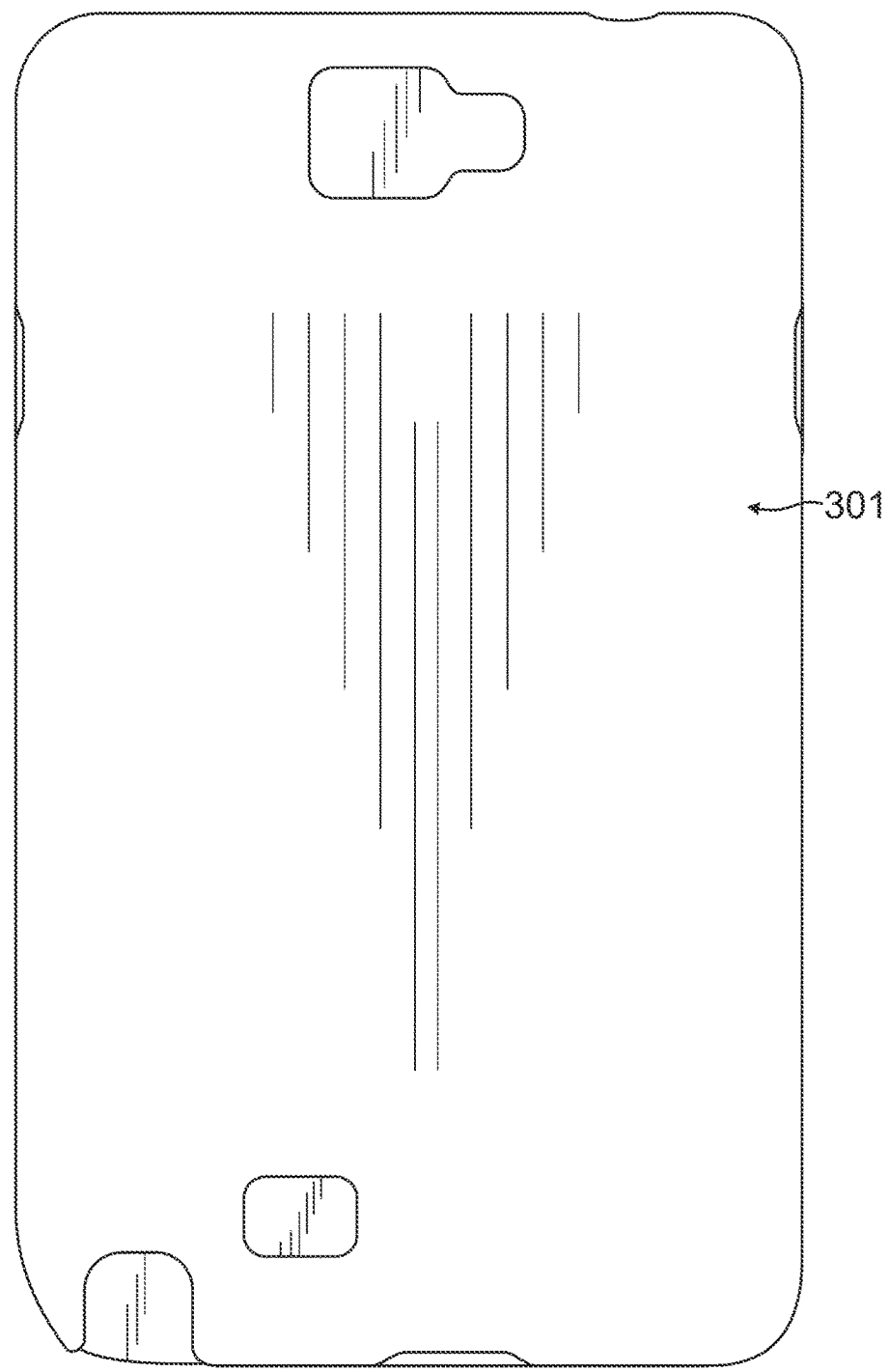
FIG. 4 shows the protective shell of FIG. 3 covering the hand held storage device to illustrate compatibility with mobile phone accessories.

FIG. 4 illustrates the device 100 properly fitted with an exemplary mobile phone protective shell 301 due to the compatible form factor. With the mobile phone form factor of device 100 as described above, there are many suitable protective shells that are readily available to be properly fitted to the device 100.

Figure 5:
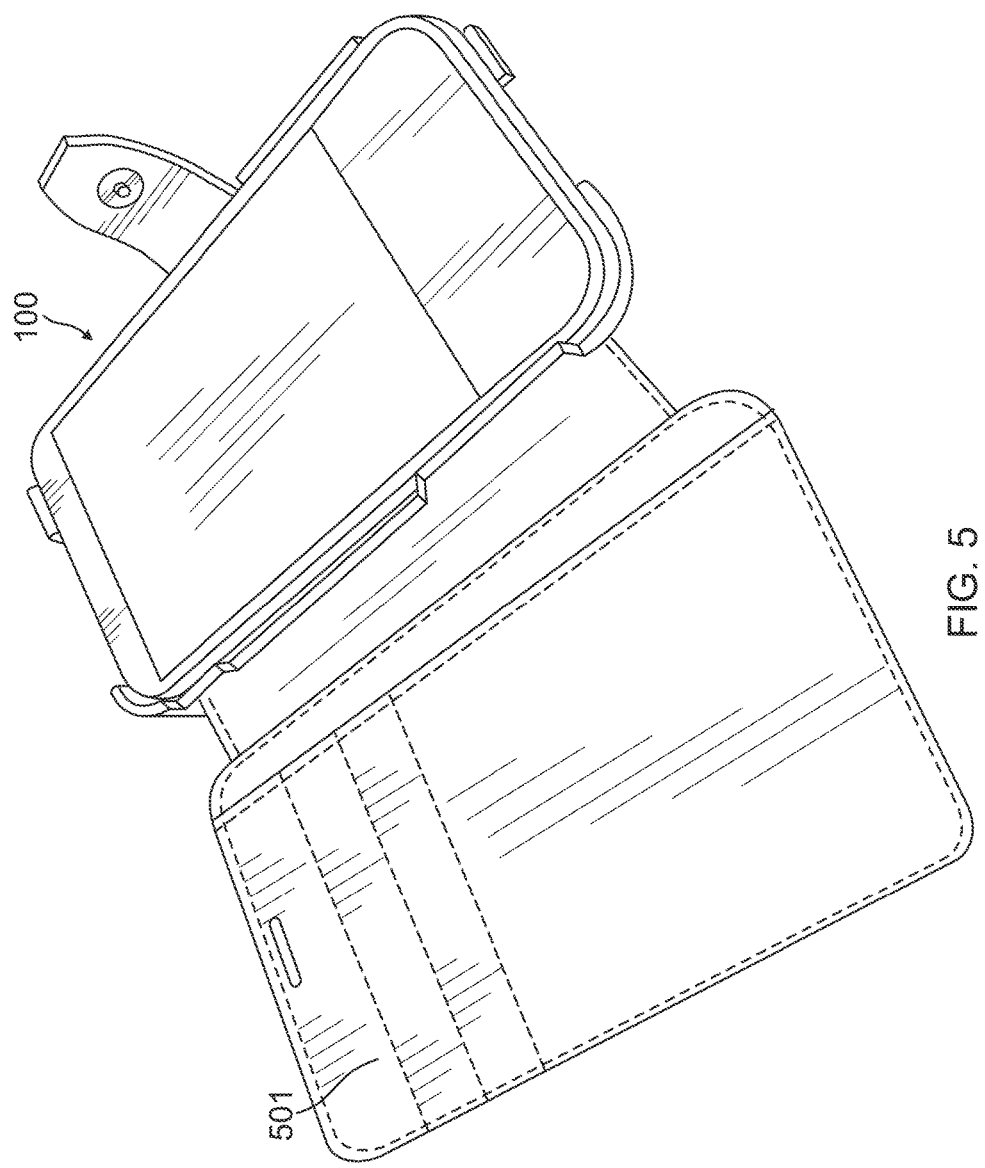
FIG. 5 shows an exemplary mobile phone wallet compatible with the hand held storage device.

FIG. 5 shows the device 100 fitted with an exemplary mobile phone wallet 501. Since the device 100 has a mobile phone form factor, there are many such functional covers that are available and well suited to the device 100.

Figure 6:
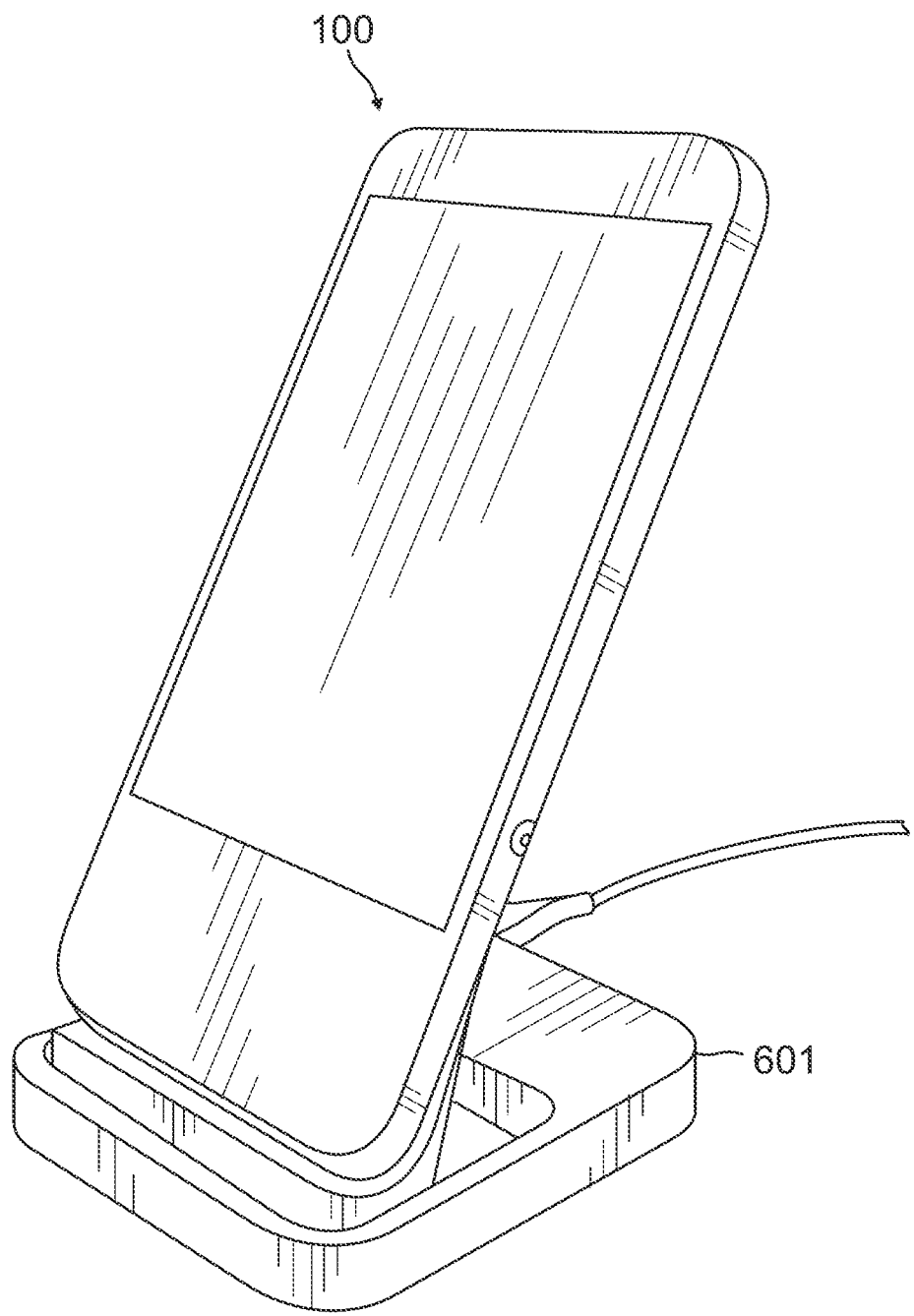
FIG. 6 shows an exemplary mobile phone docking station charging the hand held storage device.

FIG. 6 shows the device 100 coupled to an exemplary mobile phone docking station 601. Because the form factor for device 100 is compatible to a mobile phone, and device 100 is configured with a compatible power port 103, there are many available docking stations to which the device 100 can be suitably fitted.

Figure 7:
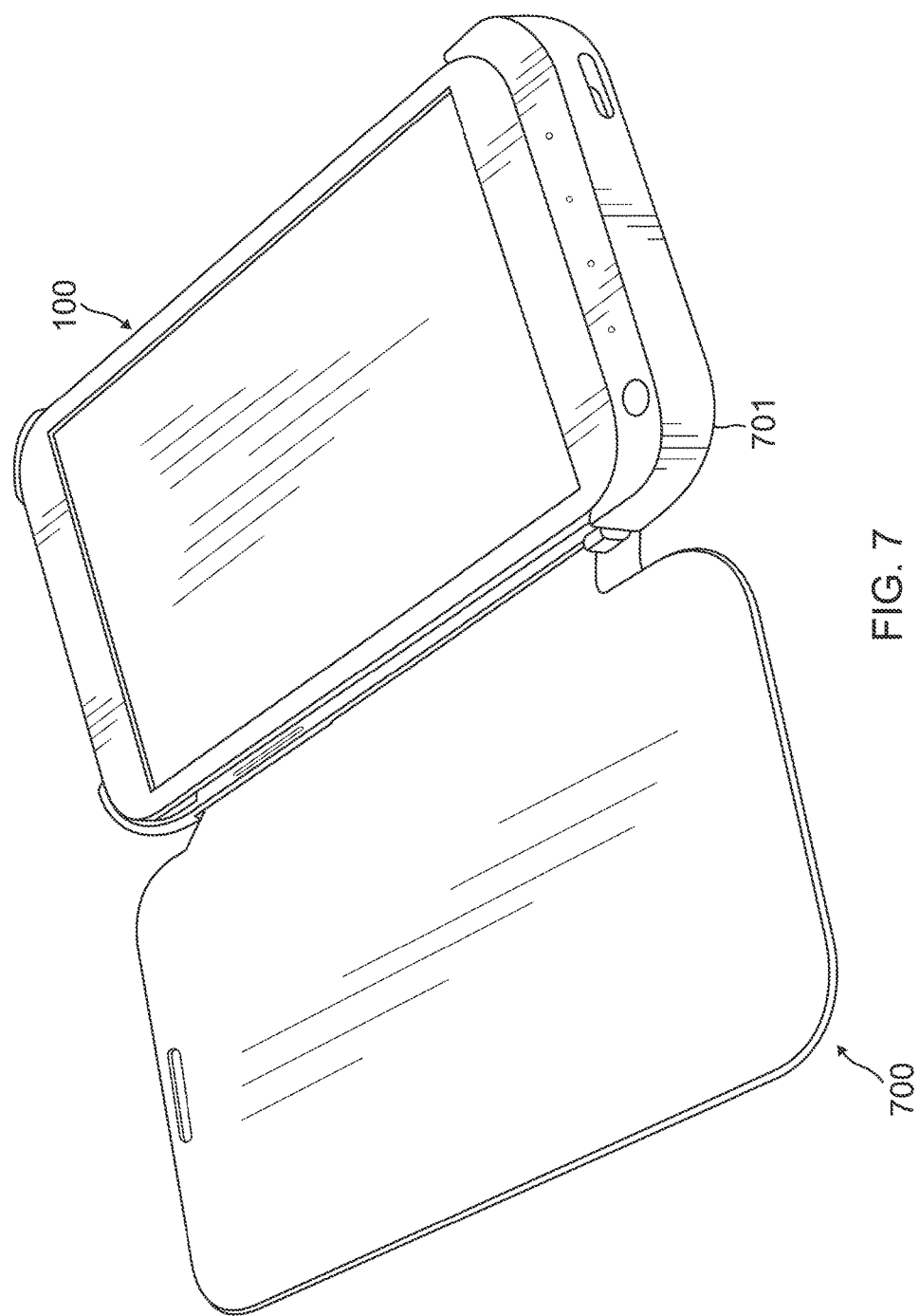
FIG. 7 shows an exemplary mobile phone battery base cover installed on the hand held storage device.

FIG. 7 shows an exemplary example of a battery base cover 701 with an optional folding protective cover 700. When the device 100 is placed within the battery base cover 701, the power port 103 is coupled to a battery within the battery base cover 701, which may deliver power to the device 100. Because the form factor for device 100 is compatible to a mobile phone, and device 100 is configured with a compatible power port 103, there are many such mobile phone battery base covers available that are similar to the battery base cover 701 to which the device 100 can be suitably fitted.

Figure 8:
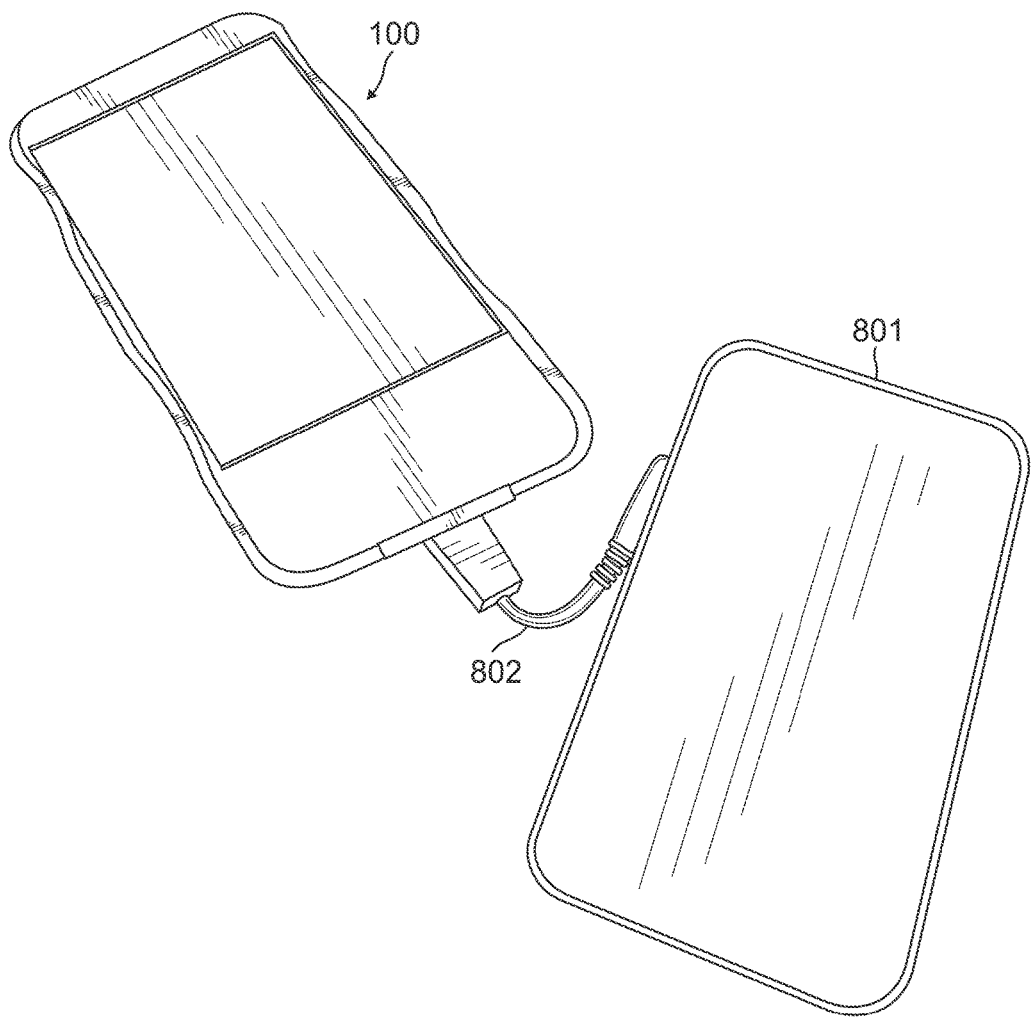
FIG. 8 shows an exemplary mobile phone battery pack connected to the hand held storage device.

FIG. 8 shows an exemplary embodiment with an external battery 801 that may be coupled to the device 100 using connection cord 802. Since the device 100 is configured with a power port 103 compatible with many power accessories used for mobile phones, the device 100 may be powered by a variety of external power sources, similar to the battery 801.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A hand held data storage apparatus, comprising:
   a disk-based storage drive comprising one or more of a hard disk drive or a solid state hybrid drive, wherein the one or more of the hard disk drive or the solid state hybrid drive comprises one or more magnetic disks;
   an interface configured for data transfer with the disk-based storage drive, wherein:
     power for the disk-based storage drive is provided exclusively by an external source via the interface and not by an internal battery;
     the interface is coupled to the disk-based storage drive via a storage drive connector; and
     the disk-based storage drive receives power from the external source and communicates data with an external device, via the storage drive connector and the interface; and
   an enclosure that encapsulates the disk-based storage drive and the interface, wherein:
     the disk-based storage drive and the coupled interface substantially extends along a longest axis of the enclosure;
     the enclosure is configured with a rectangular mobile phone form factor of a mobile phone; and
     the rectangular mobile phone form factor provides compatibility with mobile phone accessories for the mobile phone;
   wherein the hand held data storage apparatus is not a mobile phone.

2. The hand held data storage apparatus of claim 1, wherein the interface is configured as a circuit board arranged adjacent to the disk-based storage drive in a common two-dimensional plane.

3. The hand held data storage apparatus of claim 1, wherein the disk-based storage drive has a 2.5-inch media drive form factor.

4. The hand held data storage apparatus of claim 1, wherein the disk-based storage drive has a 1.8-inch media drive form factor.

5. The hand held data storage apparatus of claim 1, wherein the interface comprises:
   at least one port for supplying power from the external source to the disk-based storage drive and for wired data transfer from and to the disk-based storage drive;
   a wireless transceiver configured to perform wireless data transfer from and to the disk-based storage drive; and
   a processor for controlling whether transfer of data from and to the external device is wired or wireless.

6. The hand held data storage apparatus of claim 5, wherein the at least one port provides USB connectivity.

7. The hand held data storage apparatus of claim 5, wherein the at least one port provides Thunderbolt connectivity.

8. The hand held data storage apparatus of claim 5, wherein the wireless transceiver is WiFi compatible.

9. The hand held data storage apparatus of claim 5, wherein the wireless transceiver is Bluetooth compatible.

10. The hand held data storage apparatus of claim 1, wherein the enclosure comprises:
    a first section of a metal material configured to protect the disk-based storage drive; and
    a second section of a plastic material configured to protect the interface while permitting electromagnetic energy penetration.

11. A portable data storage apparatus, comprising:
    a disk-based storage drive comprising one or more of a hard disk drive or a solid state hybrid drive, wherein the one or more of the hard disk drive or the solid state hybrid drive comprises one or more magnetic disks;
    an interface configured for data transfer with the disk-based storage drive and to provide power to the disk-based storage drive, wherein:
      power for the disk-based storage drive is exclusively provided by an external source via the interface and not by an internal battery;
      the interface is coupled to the disk-based storage drive via a storage drive connector; and
      the disk-based storage drive receives power from the external source and communicates data with an external device, via the storage drive connector and the interface; and
    an enclosure that encapsulates the disk-based storage drive and the interface, wherein:
      the disk-based storage drive and the coupled interface substantially extends along a longest axis of the enclosure;
      the enclosure is configured with a slim thickness and a rectangular aspect ratio suitable for a hand held apparatus; and
      the slim thickness and the rectangular aspect ratio provide compatibility with mobile phone accessories for a mobile phone;
    wherein the portable data storage apparatus is not a mobile phone.

12. The portable data storage apparatus of claim 11, wherein a range of the rectangular aspect ratio is about 1.8:1 to 2:1.

13. The portable data storage apparatus of claim 11, wherein the enclosure is configured with a surface area in a range of about 9800 $mm^2$ to 13,600 $mm^2$.

14. The portable data storage apparatus of claim 11, wherein the enclosure is configured with a length within a range of about 140 mm to 160 mm.

15. The portable data storage apparatus of claim 11, wherein the enclosure is configured with a width within a range of about 70 mm to 85 mm.

16. The portable data storage apparatus of claim 11, wherein the enclosure is configured with a thickness of about 6 mm to 15 mm.

17. The portable data storage apparatus of claim 11, wherein the enclosure is configured with a thickness of about 7 mm to 11 mm.

18. A portable data storage apparatus, comprising:
    a disk-based storage drive comprising one or more of a hard disk drive or a solid state hybrid drive, wherein the one or more of the hard disk drive or the solid state hybrid drive comprises one or more magnetic disks;

an interface configured for data transfer with the storage drive and to provide power to the storage drive, wherein:

power for the storage drive is provided exclusively by an external source via the interface and not by an internal battery;

the interface is coupled to the storage drive via a storage drive connector; and the storage drive receives power from the external source and communicates data with an external device, via the storage drive connector and the interface; and an enclosure that encapsulates the storage drive and the interface, wherein:

the disk-based storage drive and the coupled interface substantially extends along a longest axis of the enclosure;

the enclosure is configured having an area to thickness ratio of about 1200:1 to 2500:1; and the area to thickness ratio provides compatibility with mobile phone accessories for a mobile phone;

wherein the portable data storage apparatus is not a mobile phone.

19. The portable data storage apparatus of claim 18, wherein the enclosure is configured with a length within a range of about 140 mm to 160 mm.

20. The portable data storage apparatus of claim 18, wherein the enclosure is configured with a width within a range of about 70 mm to 85 mm.

21. The portable data storage apparatus of claim 18, wherein the enclosure is configured with a thickness of about 6 mm to 15 mm.

22. The portable data storage apparatus of claim 18, wherein the enclosure is configured with a thickness of about 7 mm to 11 mm.

23. The portable data storage apparatus of claim 18, wherein the enclosure is configured with a surface area in a range of about 9800 $mm^2$ to 13,600 $mm^2$.

* * * * *